US008307910B2

(12) United States Patent
Holmes et al.

(10) Patent No.: US 8,307,910 B2
(45) Date of Patent: Nov. 13, 2012

(54) DRIVE MECHANISM FOR A RECIPROCATING TOOL

(75) Inventors: Brad Holmes, Chicago, IL (US); Jaime Moreno, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 12/755,710

(22) Filed: Apr. 7, 2010

(65) Prior Publication Data
US 2011/0247847 A1   Oct. 13, 2011

(51) Int. Cl.
B27B 19/09     (2006.01)
B23D 49/10     (2006.01)
(52) U.S. Cl. ................ 173/19; 30/392; 30/393
(58) Field of Classification Search .............. None
See application file for complete search history.

(56) References Cited

U.S. PATENT DOCUMENTS

| | | | |
|---|---|---|---|
| 3,461,732 A * | 8/1969 | Gregory | 74/60 |
| 3,945,120 A * | 3/1976 | Ritz | 30/393 |
| 4,550,501 A * | 11/1985 | Moores et al. | 30/393 |
| 5,555,626 A | 9/1996 | Fuchs | |
| 6,234,255 B1 | 5/2001 | Feldmann et al. | |
| 6,282,797 B1 * | 9/2001 | Osada et al. | 30/392 |
| 6,286,217 B1 * | 9/2001 | Dassoulas et al. | 30/392 |
| 6,508,151 B1 * | 1/2003 | Neitzell | 83/34 |
| 7,168,169 B2 * | 1/2007 | Moreno | 30/394 |
| 2002/0138991 A1 * | 10/2002 | Tachibana et al. | 30/392 |
| 2006/0117580 A1 * | 6/2006 | Serdynski et al. | 30/392 |
| 2008/0184569 A1 | 8/2008 | Moreno | |
| 2010/0101101 A1 * | 4/2010 | Oberheim | 30/393 |

FOREIGN PATENT DOCUMENTS

| | | |
|---|---|---|
| EP | 0 676 563 A2 | 10/1995 |
| EP | 1 295 662 A1 | 3/2003 |
| JP | 2008 114343 A | 5/2008 |
| WO | WO 94/23879 A1 | 10/1994 |

OTHER PUBLICATIONS

EP Search Report issued in related Application No. 11161134.9-1262/2374565, mailed Oct. 19, 2011.

* cited by examiner

*Primary Examiner* — Lindsay Low
(74) *Attorney, Agent, or Firm* — Greer, Burns & Crain, Ltd.

(57) ABSTRACT

A drive apparatus for a reciprocating tool, including a housing, a rotatable drive shaft assembly located in the housing, an elongated spindle located in the housing for reciprocating motion, a front bushing in the housing for supporting the front end portion of the spindle, and a wobble drive mechanism. The wobble drive mechanism preferably includes a wobble drive shaft connected to the drive shaft assembly and an elongated arm having a lengthwise axis extending upwardly from the wobble drive shaft and including an upper interface for reciprocating the spindle generally in its lengthwise direction during alternating cutting and return strokes. The upper interface connects the arm to the spindle in a manner that prevents translational movement of the spindle relative to the arm in the direction of the arm lengthwise axis, but permits rotational movement thereof in three orthogonal axes.

7 Claims, 16 Drawing Sheets

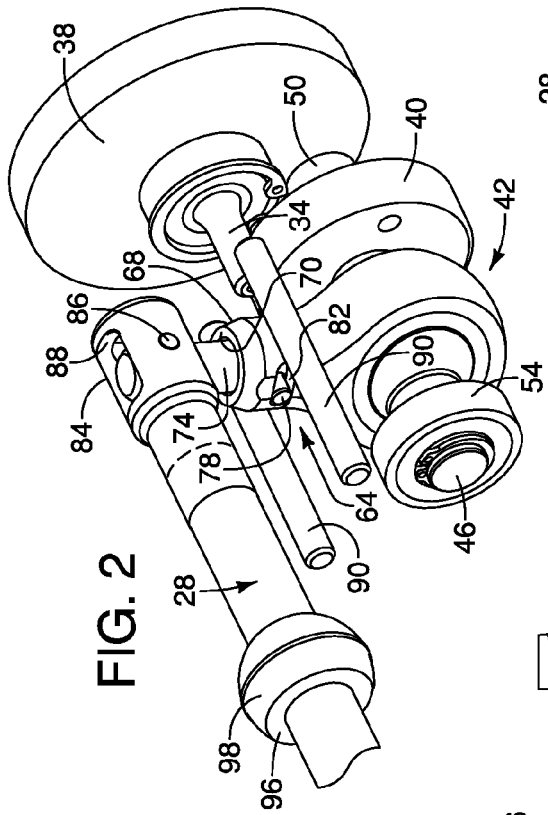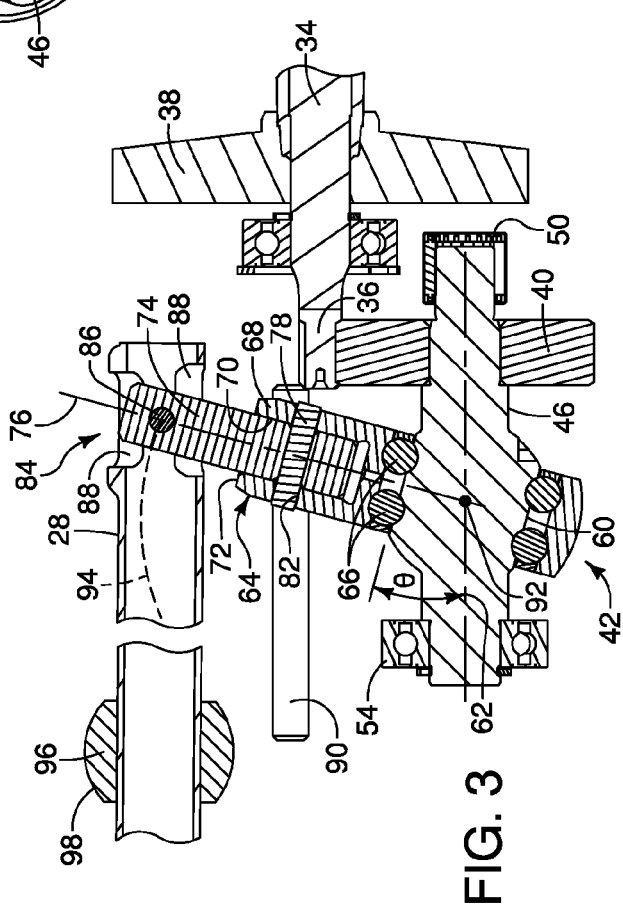

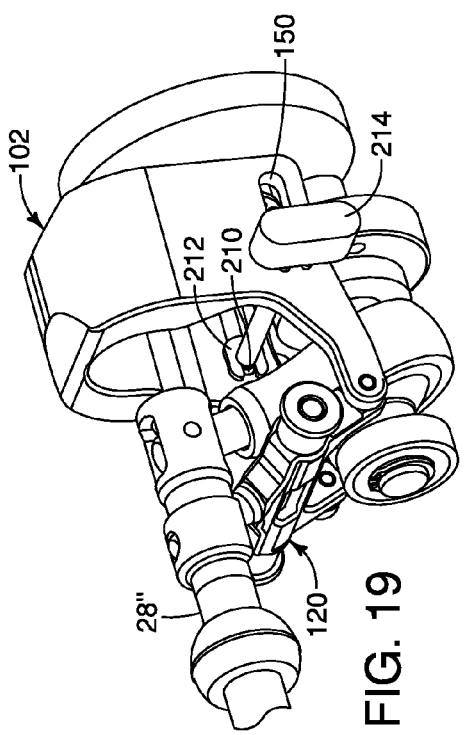
FIG. 19
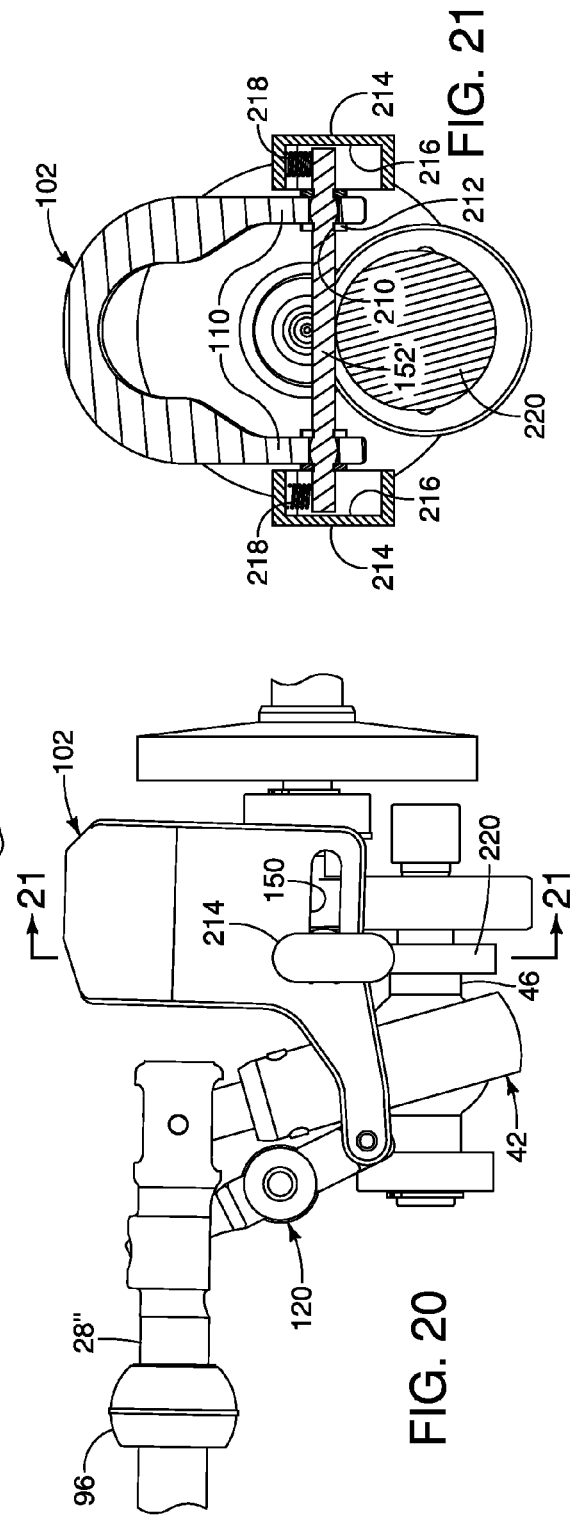
FIG. 21
FIG. 20

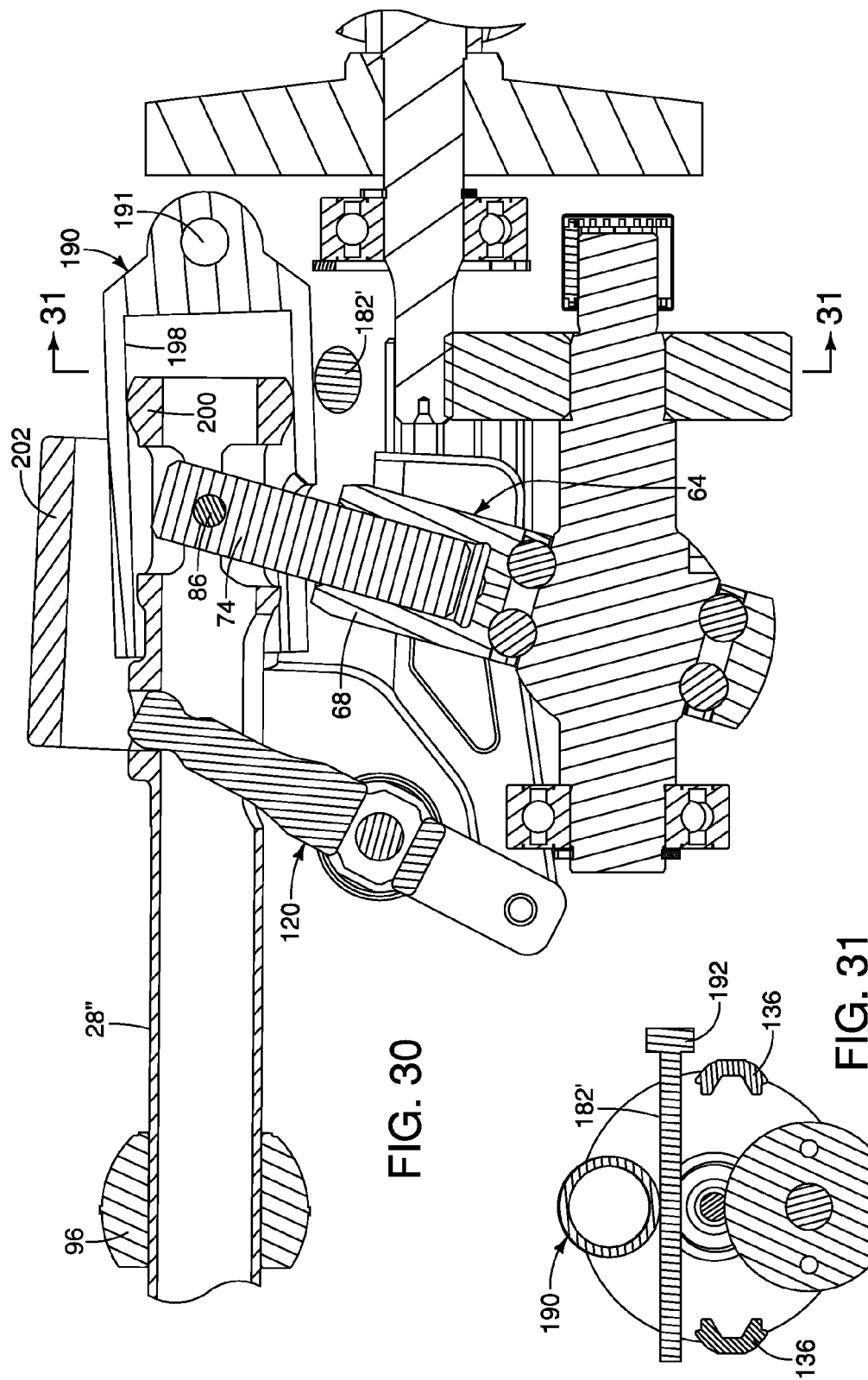

DRIVE MECHANISM FOR A RECIPROCATING TOOL

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion. Among the types of mechanisms that convert the rotary motion to reciprocating motion includes a wobble plate drive mechanism that is well known to those of ordinary skill in the art.

There has been much research and development over the years attempting to improve the cutting efficiency of such reciprocating saws as well as reduce the vibration that is experienced by users of them. There has also been much effort put forth to achieve those goals and also to reduce friction and power consumption with saws that are compact and convenient to use.

SUMMARY OF THE INVENTION

Embodiments of the present invention are directed to a drive apparatus for a reciprocating tool, comprising a housing, a rotatable drive shaft assembly located in the housing, an elongated spindle located in the housing for reciprocating motion, the spindle having a front end portion for attaching a cutting blade thereto and a rear portion, a front bushing in the housing for supporting the front end portion of the spindle, the bushing permitting reciprocating and limited angular motion of the spindle therein, and a wobble drive mechanism comprising a wobble drive shaft connected to the drive shaft assembly, an elongated arm having a lengthwise axis extending upwardly from the wobble drive shaft and including an upper interface for reciprocating the spindle generally in its lengthwise direction during alternating cutting and return strokes, wherein the upper interface connects the arm to the spindle in a manner that prevents translational movement of the spindle relative to the arm in the direction of the arm lengthwise axis, but permits rotational movement thereof in three orthogonal axes.

Another embodiment is directed to a drive apparatus for a reciprocating tool, comprising a housing, a rotatable drive shaft assembly located in the housing, an elongated spindle located in the housing for reciprocating motion in its lengthwise direction, the spindle having a front end portion for attaching a cutting blade thereto and a rear portion, a front bushing in the housing for supporting the front end portion of the spindle, the bushing permitting reciprocating and limited angular motion of the spindle therein, a wobble drive mechanism comprising a wobble drive shaft connected to the drive shaft assembly, an elongated arm having a lengthwise axis extending upwardly from the wobble drive shaft and including an upper pivot connection to the spindle for reciprocating the spindle generally in its lengthwise direction during alternating cutting and return strokes, the upper pivot connection preventing translational movement of the spindle relative to the arm in the direction of the arm lengthwise axis, an elongated rocker having an upper end portion with an interface to the spindle, a lower end portion having two spaced apart side walls, each side wall having a counterweight pivot connection for connection to a counterweight, and a housing pivot connection to the housing located between the upper and lower end portions, a counterweight having a main portion that extends above and on opposite sides of the spindle and side portions that extend downwardly to the counterweight pivot connections, and a support configuration associated with the counterweight and housing for supporting the counterweight while permitting reciprocating movement of the counterweight in the housing in a direction generally parallel to the spindle movement.

Another embodiment is directed to a drive apparatus for a reciprocating tool, comprising a housing, a rotatable drive shaft assembly located in the housing, an elongated spindle located in the housing for reciprocating motion in its lengthwise direction, the spindle having a front end portion for attaching a cutting blade thereto and a rear portion, a front bushing in the housing for supporting the front end portion of the spindle, the bushing permitting reciprocating and limited angular motion of the spindle therein, a wobble drive mechanism comprising a wobble drive shaft connected to the drive shaft assembly, an elongated arm having a lengthwise axis extending upwardly from the wobble drive shaft and including an upper pivot connection to the spindle for reciprocating the spindle generally in its lengthwise direction during alternating cutting and return strokes, the upper pivot connection preventing translational movement of the spindle relative to the arm in the direction of the arm lengthwise axis, an elongated rocker having an upper end portion with an interface to the spindle, a lower end portion having two spaced apart side walls, each side wall having a counterweight pivot connection for connection to a counterweight, and a housing pivot connection to the housing located between the upper and lower end portions, a counterweight having a main portion that extends above and on opposite sides of the spindle, side portions that extend downwardly to the counterweight pivot connections, and a forward extension from a bottom of each of the side portions, the counterweight pivot connections being connected to the forward extensions, a support configuration associated with the counterweight and housing for supporting the counterweight while permitting reciprocating movement of the counterweight in the housing in a direction generally parallel to the spindle movement, the support configuration comprising an elongated slot in each of the side portions oriented in a direction generally parallel to the spindle movement, and a pin mounted in the housing and operatively extending to each of the slots and permitting the reciprocating movement, and a cam surface on the wobble drive shaft configured to move the pin and the counterweight in a vertical direction during reciprocation of the counterweight, the opposite ends of the pin being mounted in the housing in a manner permitting vertical movement thereof responsive to rotation of the wobble drive shaft and cam for creating an arcing motion to the counterweight for neutralizing arcing movement of the spindle.

DESCRIPTION OF THE DRAWINGS

FIG. 2 is a perspective view similar to FIG. 1, but showing only portions of the drive mechanism together with portions of a drive mechanism of a reciprocating saw;

FIG. 3 is a cross section taken generally along the center line of the drive mechanism shown in FIG. 2;

FIG. 4 is a cross section of the drive mechanism shown in FIG. 2, taken along a plane defined by the dotted lines in FIG. 2;

FIG. 19 is a perspective view of a sixth preferred embodiment of the present invention shown with portions removed to illustrate the drive mechanism thereof;

FIG. 20 is a side view of the drive mechanism shown in FIG. 19;

FIG. 21 is a cross section taken generally along the line 21-21 in FIG. 20;

FIG. 30 is side view of a cross-section taken along the center line of the drive mechanism of the reciprocating saw shown in FIG. 26, illustrating the spindle in a retracted position and with an orbital control lever in an ON position; and FIG. 31 is a cross section taken generally along the line 31-31 of FIG. 30.

DETAILED DESCRIPTION

Figure 1:
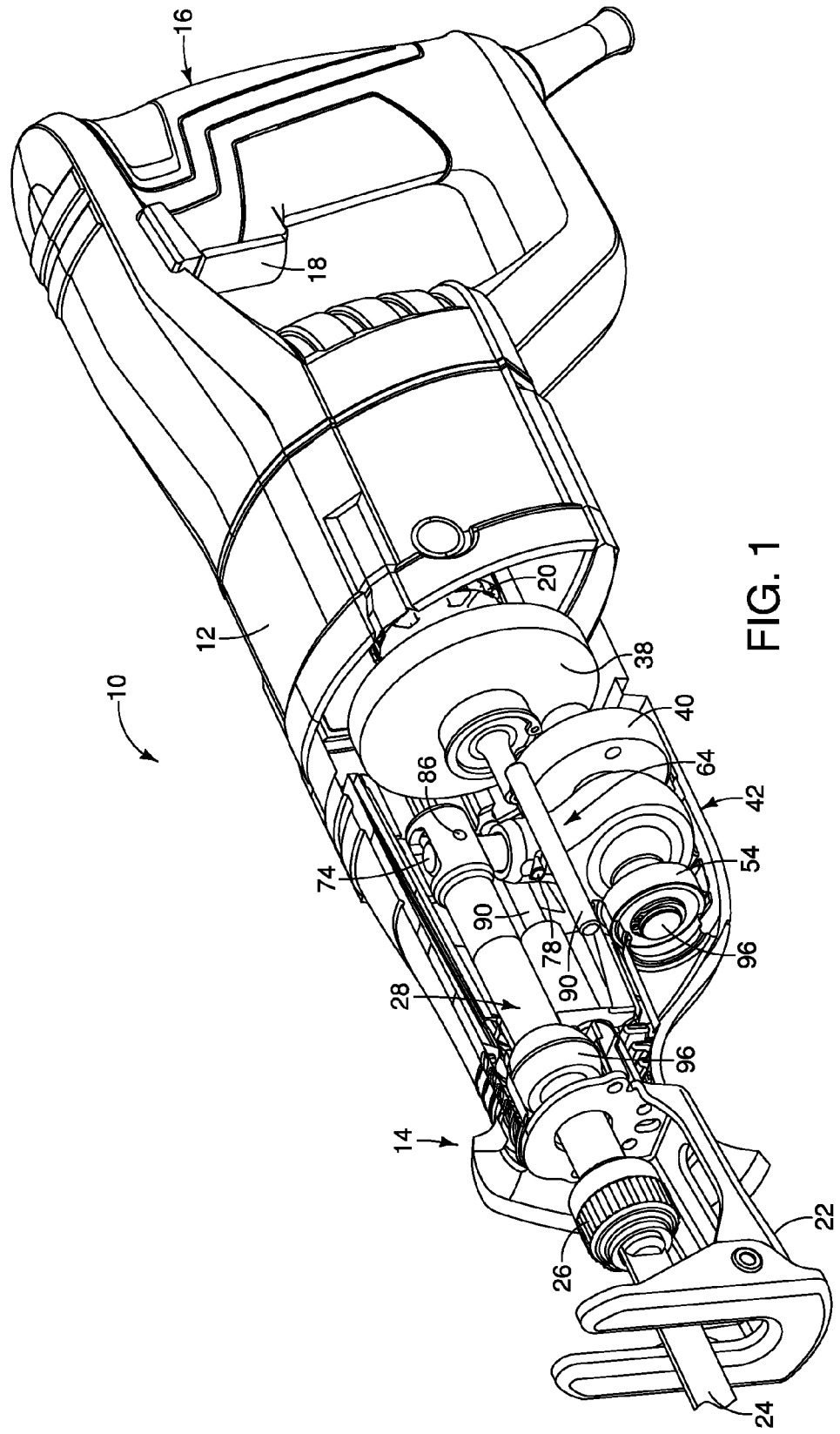
FIG. 1 is a perspective view of a first preferred embodiment of the present invention shown with portions removed to illustrate the drive mechanism of a reciprocating saw.

Several embodiments of the present invention are described in the present specification and shown in the drawings. All embodiments are directed to reciprocating saw drive mechanisms that employ a wobble arm mechanism for reciprocating the spindle of the reciprocating saw, with the spindle having a clamping mechanism for securing a blade therein. The embodiments all use a wobble plate drive and operate in a manner which is very efficient and utilizes designs which are compact and effective. While not all embodiments employ a counterweight in their design and construction, many embodiments do and operate in a manner which minimizes the degradation that is created due to the reciprocating action of the plunger. Many of the embodiments have components which are common to one another and where practical, are given the same reference numbers. Where components are given the same reference number with regard to different embodiments, it is intended that the function of those components would be very similar and may not be described with regard to all of the embodiments. Where structural differences exist with a comparable component, it may be given a prime designation to indicate structural differences.

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action driven by a wobble plate drive mechanism and powered by a motor having a rotating output shaft.

The first embodiment of the present invention is directed to a compact reciprocating saw driven by a wobble plate drive mechanism where the wobble mechanism creates an automatic orbital movement of the blade during its reciprocation. The connection between the wobble plate drive shaft to the spindle is a rigid connection in the sense that the spindle does not move relative to the spindle along the lengthwise direction of the wobble arm and therefore causes the spindle to follow in an arcing motion during reciprocation of the spindle. Stated in other words, as the wobble drive moves in its reciprocating motion, the motion of the connection causes the spindle to follow an arcuate path which is similar to an orbital motion. This orbital path is defined by the arcing motion of the wobble arm combined with the location of a front pivoting bushing that anchors the front portion of the spindle where it exits the front of the tool. Even though the pivot connection of the end of the wobble arm to the spindle, the spindle is able to rotate in all other directions, i.e., except in the lengthwise direction of the wobble shaft. This movement will be further described in connection with the drawings, and particularly FIGS. 1-4.

Referring to FIGS. 1-4, a reciprocating saw, indicated generally at 10, has a housing 12 which includes a nose portion indicated generally at 14 that is flared outwardly so that a user can hold the nose portion with one hand while holding a handle, indicated generally at 16, with the other. A trigger switch 18 is provided in the handle portion 16 for turning on a motor 20 that drives the tool. The saw has a shoe 22 at the nose end portion 14 and a saw blade 24 is mounted in a blade clamping mechanism 26 that is mounted at the end of an elongated spindle, indicated generally at 28. The motor 20 has an output shaft 34 with a pinion gear 36 and fan member 38 operatively attached to the shaft 34, with the gear 36 engaging a larger gear 40 that is connected to a wobble drive mechanism, indicated generally at 42, which drives the spindle 28 in a reciprocating manner. The teeth of the pinion gear 36 and gear 40 are not shown for the sake of simplicity, but are conventional as is known to those of ordinary skill in the art.

More particularly, the wobble drive mechanism 42 has a drive shaft 46 to which the gear 40 is attached. The shaft has an end portion that is supported in a needle bearing 50 or the like and an opposite end supported in another ball bearing 54 that is mounted in the housing 12. It should be understood that the manner in which the motor 20, gears 36 and 40 as well as the shaft 46 are mounted in the housing 12 is not shown in detail inasmuch as such is conventional and is also well known to those of ordinary skill in the art.

With regard to the wobble drive mechanism 42, the shaft 46 has generally cylindrical shaped portion 60 best shown in FIG. 3 that is oriented at an acute angle θ relative to the axis of the shaft 46 as shown by a dashed line 62. The wobble drive mechanism 42 has an elongated arm, indicated generally at 64, that is mounted in ball bearings 66 for rotation relative to the cylindrical portion 60, which permits the arm 64 to move in a left and right direction relative to the cylindrical portion 60 as the shaft 46 is rotated during operation.

More particularly, as the shaft 46 is rotated, the angular orientation of the cylindrical portion 60 changes, and the arm 64 of the wobble drive mechanism 42 is moved in a reciprocating manner, i.e., to the left as shown in FIG. 2, and to the right as shown in FIG. 3. Such operation is well known to those of ordinary skill in the art.

As is shown in all of the FIGS. 1-4, the elongated arm 64 is made of a base arm portion 68 which has a cylindrical aperture 70, its upper end 72 that extends a substantial distance to a level adjacent the ball bearings 66. The aperture 70 is sized to receive an arm adaptor 74 which is snugly fit in the aperture but which is capable of rotating movement around a center axis identified by line 76 of FIG. 3. The adaptor 74 is connected to the base arm portion 68 by a pin 78 that fits within a suitable aperture 82, or slot, in the adapter 74 which is sized so that the pin 78 can rotate a limited degree around the center line 76. The pin 78 is preferably centered in the width of the slot 82 so that it can rotate in either direction around the axis 76 of the adaptor 74. The rotatability of the adaptor in the base arm portion 68 enables stresses to be removed that are generated by reciprocating motion of the spindle 28.

The rigid connection of the elongated arm 64 to the spindle 28 is provided by a pin 86 that extends through the upper end portion of the adaptor 74 and suitable apertures in the right end portion, indicated generally at 84 of the spindle 28. The right end portion 84 has a slightly enlarged diameter portion as well as recesses 88 in the top and bottom thereof which enable the adaptor to be inserted therein and the pin 86 enables pivoting movement between the spindle 28 and the adaptor 74. It should be understood that the reciprocating motion of the wobble drive mechanism 42 results in rotation of the elongated arm 64 relative to the axis 62 of the shaft 46 and for that reason, it must be limited which in the present embodiment is provided by a pair of cylindrical rods 90 that are shown in the drawings, with one of the rods being provided on each side of the base arm portion 68, suitably mounted in the housing to prevent such rotational movement of the elongated arm 64. In this regard, and as best shown in FIGS. 1, 2 and 4, the cylindrical rod 90 contacts a curved surface of the base arm portion 68 in a generally perpendicular orientation which results in a single point contact between each rod and the base arm portion 68 which minimizes friction.

During rotation of the shaft 46, the wobble drive mechanism 42 effective pivots around the center of the cylindrical portion 60, identified at point 92, so that the rigid pivot pin 86 will travel through an arc and applied by the dotted line 94 has the wobble drive mechanism move the spindle. Since the pivot pin 86 is centered in the spindle as shown in FIG. 3, the spindle will move vertically during its reciprocating travel so that the pin 86 will traverse the path identified by the line 94. The spindle is slidable in a bushing 96 located at the nose portion 14 of the housing 12 and it has a spherical outer surface 98 that is suitably mounted in a similar curved surface so that the angle of the spindle can change.

As should be appreciated by considering FIG. 3, the blade which is left to the left of the front bushing 96 will move downwardly (as the right end portion 84 moves upwardly) before being elevated during the reciprocating motion. It should be understood that the cutting action is generally on a return to its fully retracted position which is shown in FIG. 3 so that as the blade is moved to the right cutting through the work piece or the like, the right end portion 84 is moving upwardly which causes the blade to move more aggressively into the work piece which is a desirable feature and the subject of such orbital action. It should be understood that while changing the angle of the blade during engagement with a work piece is commonly referred to as orbital action which provides a more aggressive cutting action during the return or cutting scope, it should be understood that such characterization may not be entirely orbital but in a nonlinear manner which achieves the same goals. The spherical surface 98 of the front bushing 96 allows it to rotate freely in all three axes because of the spherical connection between the housing and the bushing.

A second preferred embodiment is shown in FIGS. 5-8 which have many features that are similar to the embodiment shown in FIGS. 1-4. A principal difference in the second preferred embodiment is the addition of a counterweight which counterbalances the reciprocating saw mechanism and provides for left vibration and a smoother feeling operation by a user. The counterweight is efficiently incorporated into the design so that it is compact and is nearly the same size as the FIG. 1 configuration. The design utilizes the rigid pivot connection between the spindle and the wobble drive mechanism to thereby achieve the same orbital or nonlinear type of cutting motion during reciprocation of the blade.

Figure 5:
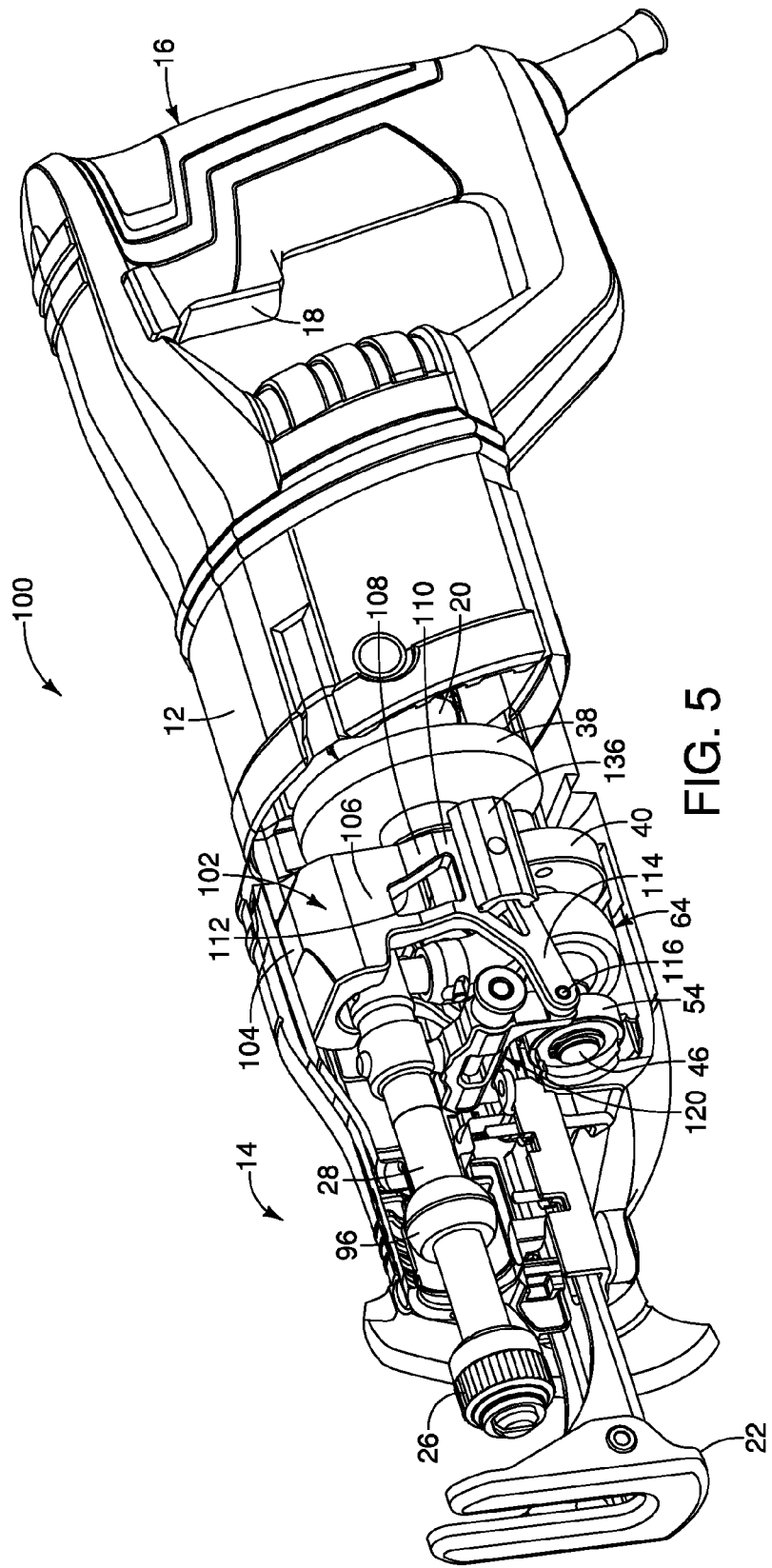
FIG. 5 is a perspective view of a second preferred embodiment of the present invention, shown with the portions removed to illustrate the drive mechanism thereof.
Figure 7:
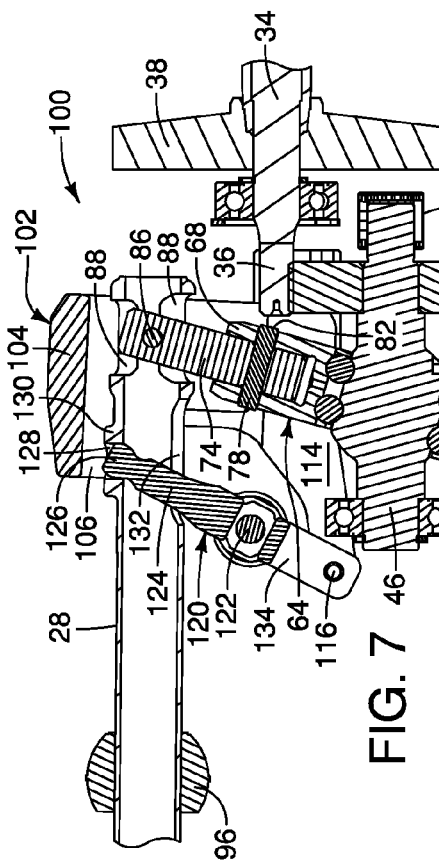
FIG. 7 is a cross section taken generally through the center line of the drive mechanism shown in FIG. 6.
Figure 8:
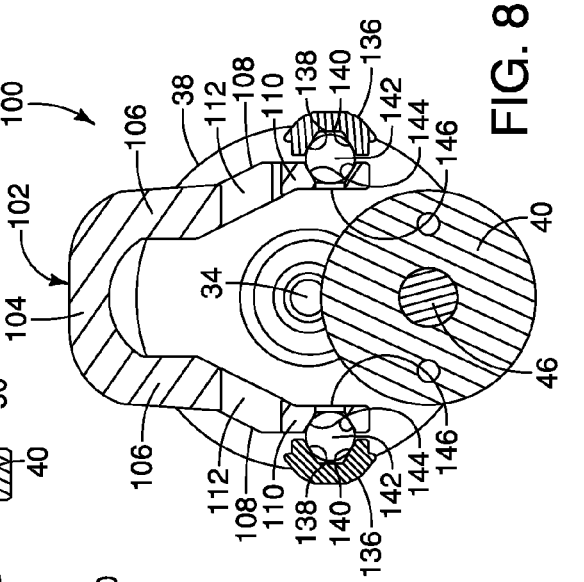
FIG. 8 is a section taken generally along the line 8-8 of FIG. 6.

Referring to FIGS. 5-8, the embodiment, indicated generally at 100, includes a counterweight, indicated generally at 102, which is preferably made of steel and has sufficient mass to balance the forces generated by the plunger and its drive mechanism. The counterweight 102 is designed and configured to surround the spindle 28 so that it has a center of gravity that approximates the center of gravity of the spindle during operation. Such configuration results in less vibration. To this end, the counterweight 102 has a top portion 104 that merges with side portions 106. The side portions 106 extend downwardly to slightly outwardly flared transition portions 108 that merge with lower leg portions 110. As is best shown in FIGS. 7 and 8, the thickness of the As is shown in FIG. 5, the drop side portions 106 and transition portions 108 have a cutout portion 112 removed. This is done for the purpose of proper weight distribution and such cutout portions 112 may or may not be provided depending upon the necessary mass that is required for achieving the desired counterbalancing. The lower leg portions 110 also have a forward extension 114 with a pivot connector 116 that is connected to a rocker arm, indicated generally at 120, that is also connected to the spindle 28 and operates to reciprocate the counterweight 102 in a direction opposite that of the movement of the spindle 28.

The rocker arm 120 has a pivot pin 122 that rides in bearings (not shown) and the rocker arm 120 pivots about the pin 122 during operation. The rocker arm 120 has an upper arm portion 124 which terminates in a spherical ball end portion 126 that rides in a cylindrical aperture 128 which is located in a thickened top portion 130 of the spindle 28. The upper arm portion 124 extends through a suitable opening 132 in the bottom of the plunger during reciprocation of the spindle 28, because of the rigid connection 86 between the wobble drive mechanism 64 and the spindle 28, the spindle will move in a vertical manner during reciprocation of the spindle and therefore there will be some relative movement between the ball 126 and the cylindrical opening 128 during operation. Additionally, there will be pivoting movement so that the ball will not only pivot, but will also slide within the cylindrical opening 128. The rocker arm 120 also has a lower extension 134 that connects to the forward extension 114 of the counterweight 102. This is achieved by the pivot connection 116. The relative distance between the pivot connection 122 and the ball 126 compared to the distance between the pivot connection 122 and 116 will determine the amount of movement that the counterweight travels during a cutting and return stroke of the spindle 28. Such distances can be changed depending upon the mass of the counterweight, the dynamics of the wobble drive mechanism and spindle and such consideration can be optimized to achieve the desired reduction in vibration. Such analysis is known to those of ordinary skill in the art of tool design.

The counterweight 102 is mounted in the housing and is supported by a pair of generally horizontally oriented bushings 136 which are preferably pressed into the housing but is not shown in the drawings. The bushings 136 have a recess defined by a bottom surface 138 and opposed inclined surfaces 140. The recesses extend at least the length of travel that is provided for the counterweight 102 and the recesses cooperate with an associated rolling ball 142 which is sized to contact the inclined surfaces 140 and not the bottom surface 138. The balls 142 also contact a complimentary pair of inclined surfaces 144 in the lower right portion 110, with these surfaces 144 terminating in an opening 146 that extends through the entire thickness of the lower length 110. This connection enables the counterweight to be moved along a desired path relative to the housing and be supported in a manner that is extremely efficient. In this regard, the bushings 136 are shown to have a recess that is straight and oriented substantially horizontally. However, it should be understood that it may be oriented at an angle to change the vertical position of the counterweight during its reciprocation. Further, it may be curved along its length to provide a desired profile of vertical movement during such reciprocation to balance the movement of the spindle, or stated in other words, to optimize the reduction of vibration created by the spindle by the counterweight movement during operation.

The connection utilizes the two rolling balls 142 that are captured by the bushings 136 that are pressed into the front housing. The balls 142 are captured by the two chamfered surfaces 140 in the bushings 136 which are preferably oriented less than 45° relative to the bottom surface 138 to allow the balls 142 to rotate freely in all directions and contact the bushing with single edge contacts at two points. The counterweight 102 also has two V-groove inclined surfaces 144 that are also less than 45° from the contact plane which allows the rolling balls to roll in the grooves as the counterweight moves back and forth. The connection allows for rotation of the counterweight in all directions and is an efficient way for the counterweight to move back and forth, in reducing friction. As is evident, the contact system also constrains the counterweight from moving in a side to side direction.

Figure 6:
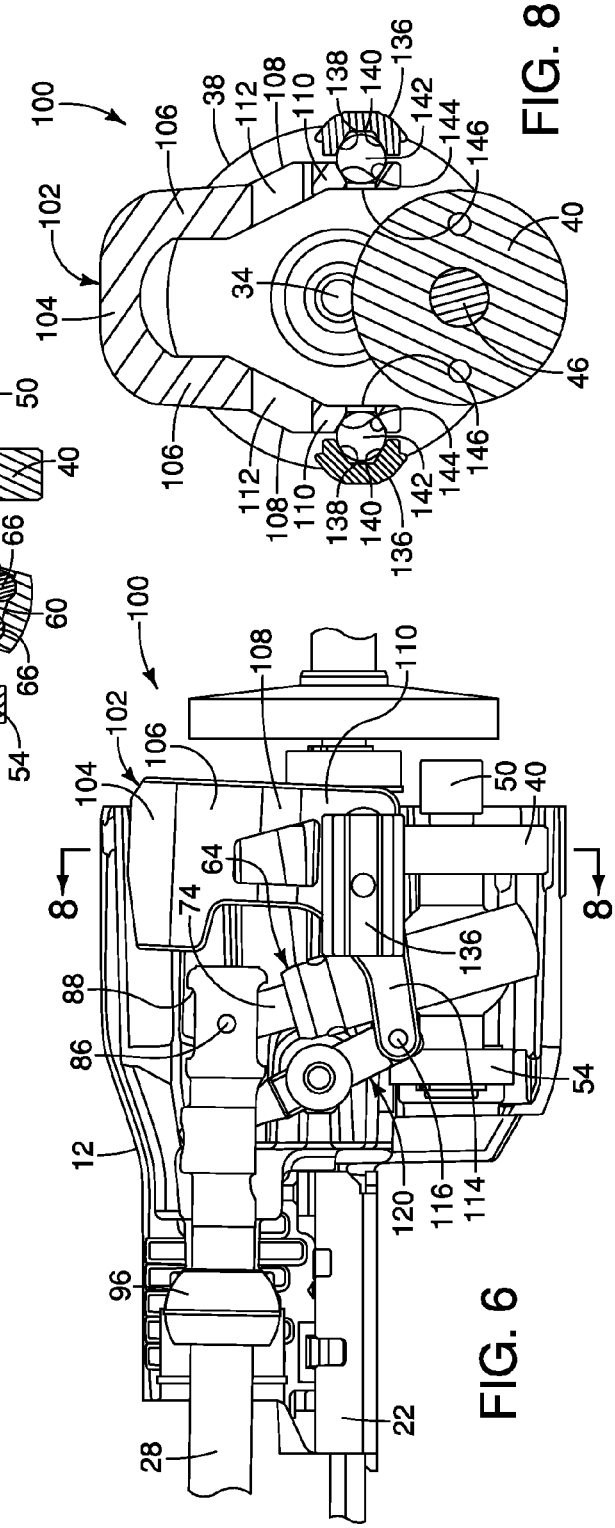
FIG. 6 is a side view of a portion of the second preferred embodiment shown in FIG. 5.
Figure 11:
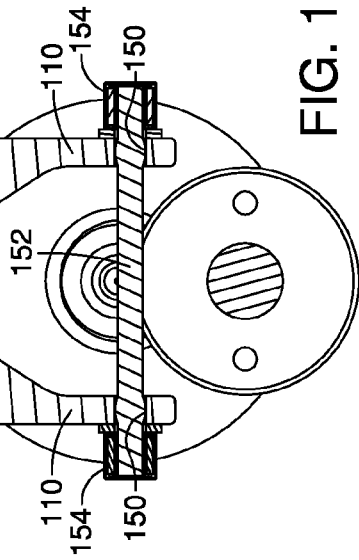
FIG. 11 is a cross section taken generally along the line 11-11 of FIG. 10.
Figure 9:
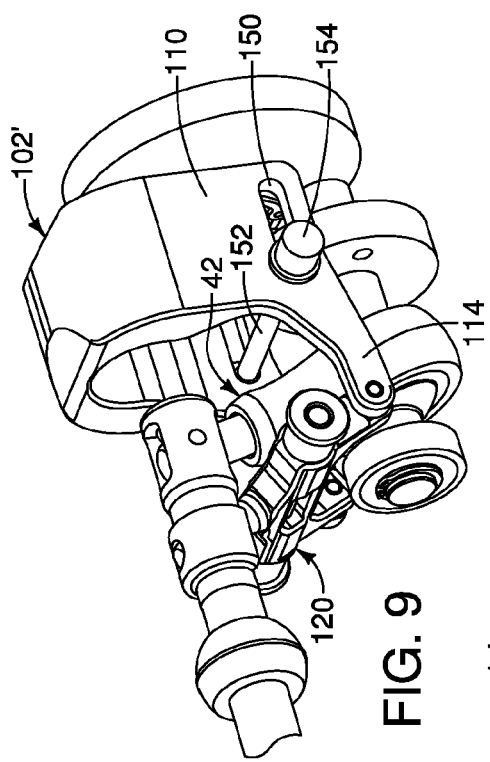
FIG. 9 is a perspective view showing a portion of a third preferred embodiment of the present invention, illustrating the drive mechanism thereof.
Figure 10:
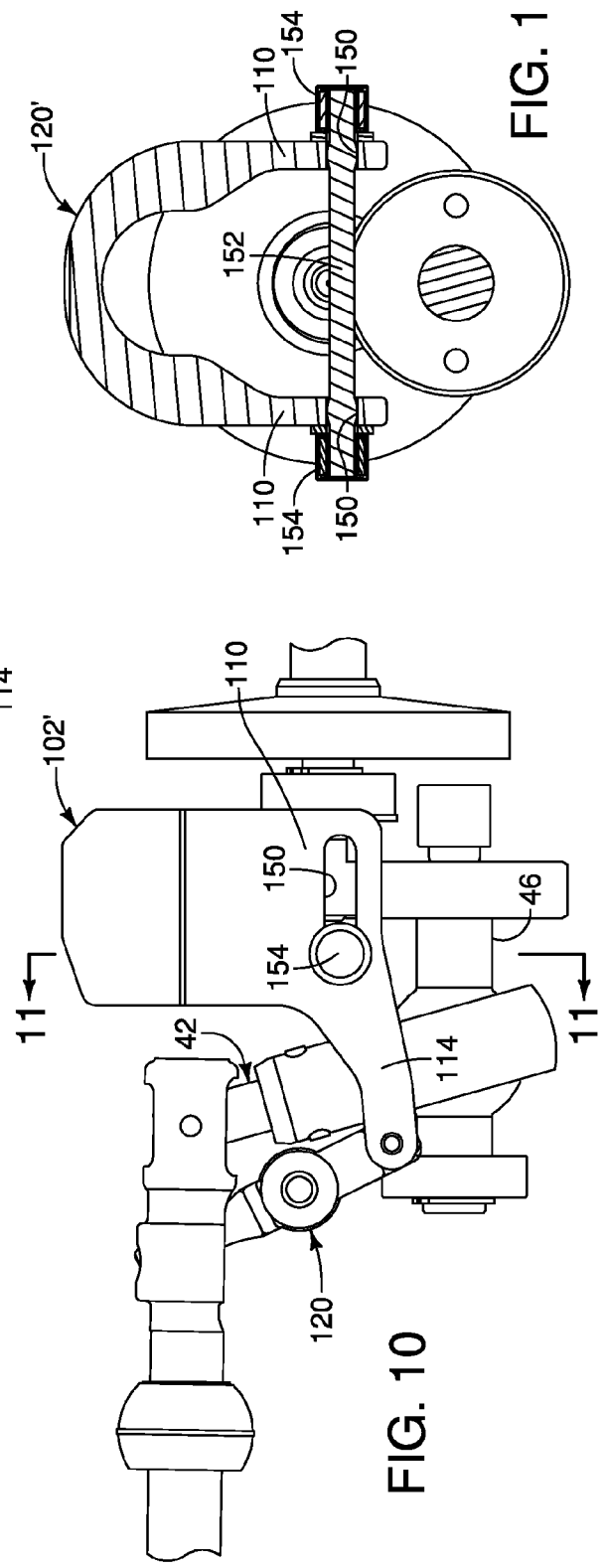
FIG. 10 is a side view of the third preferred embodiment shown in FIG. 9.

A third preferred embodiment is shown in FIGS. 9-11 which is very similar to the second preferred embodiment shown in FIGS. 6-8. Because most of the components of the embodiment shown in FIGS. 9-11 are identical to those shown in the second preferred embodiment shown in FIGS. 6-8, the reference numbers are not applied to a vast majority of the components shown in FIGS. 9-11. However, the differences are discussed and generally relate to the support of the counterweight 102'. More particularly, the counterweight 102 has a pair of horizontally oriented elongated slots 150 located in the lower leg 110 of the counterweight 102', with the length of the horizontal slots 150 generally corresponding to the length of travel of the counterweight 102' produced by the wobble drive mechanism 42. The counterweight 102' has a horizontal shaft 152 that extends between both sides 110 and is journaled in needle bearings 154 that have their outer braces mounted in a suitable recess within the housing 12 (not shown). The needle bearings enable the shaft 152 to rotate within the needle bearings 154 so that during reciprocating motion by the counterweight 102', the shaft 152 is free to rotate within the slots 150.

It should be understood that the width of the slots 150 should be approximately equal to the diameter of the shaft 152 at the location where the shaft is coextensive with the leg portions 110 and as shown in FIG. 11, the shaft 152 has a slight spherical shaped bulge where it contacts the counterweight 102' for the purpose of providing generally point to point contact between the shaft 152 and the upper surface of the slot 150 for the purpose of reducing friction during movement of the counterweight.

Figure 12:
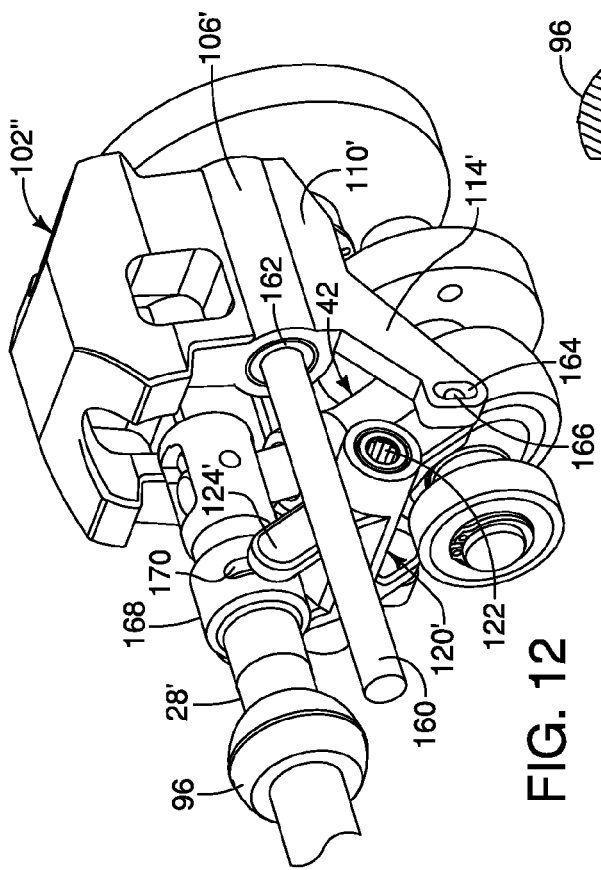
FIG. 12 is a perspective view of a fourth preferred embodiment of the present invention, illustrating the drive mechanism thereof.
Figure 13:
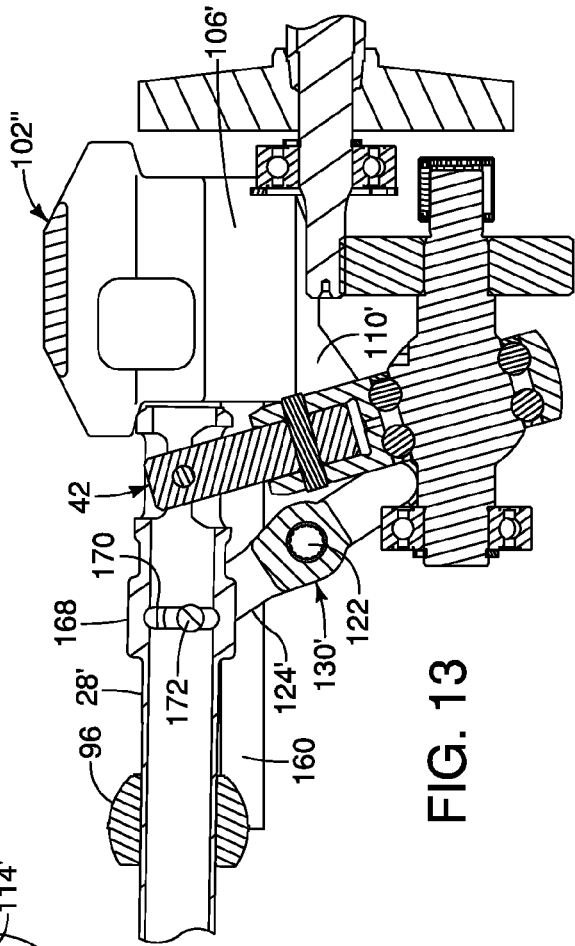
FIG. 13 is a cross section taken generally along the centerline of the length of the drive mechanism shown in FIG. 12.
Figure 14:
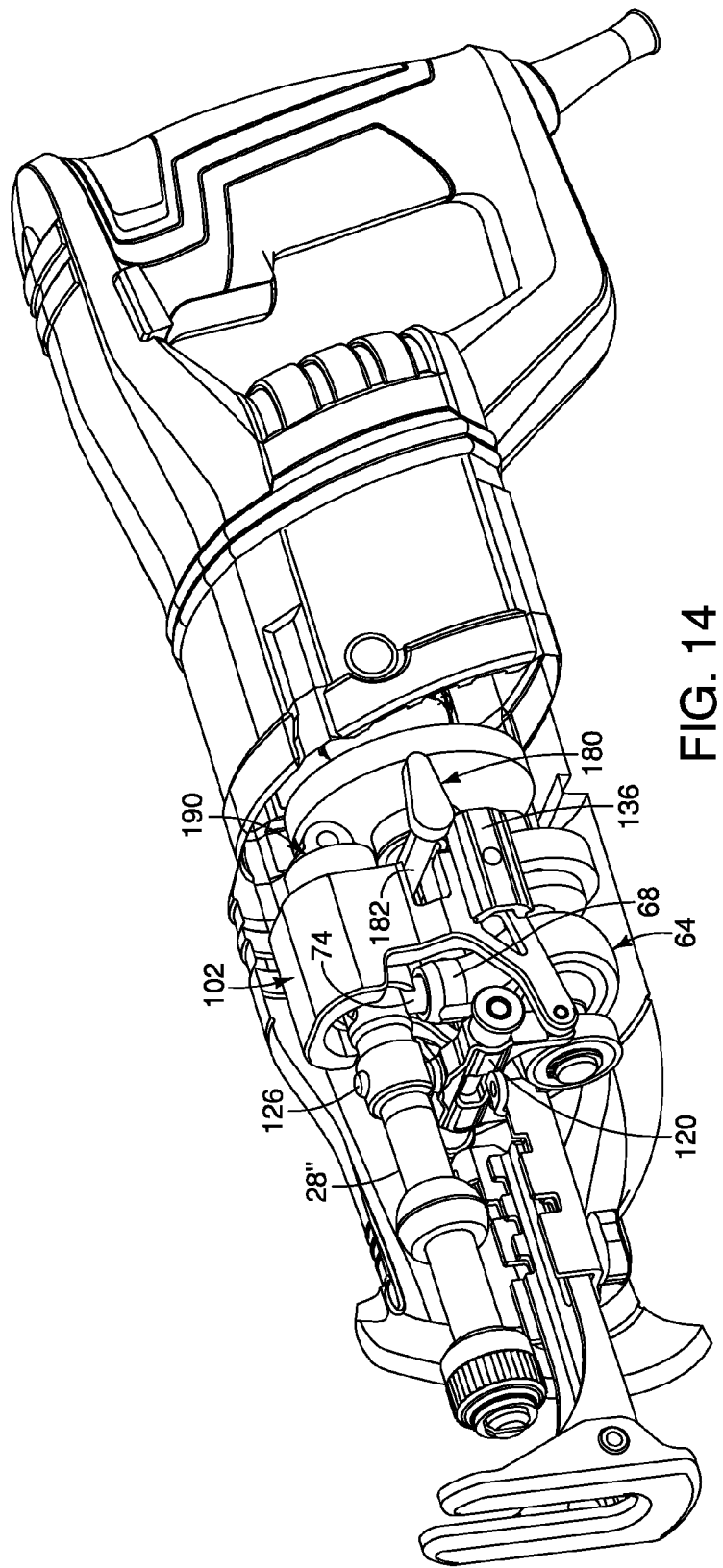
FIG. 14 is a perspective view of a fifth preferred embodiment of the present invention shown with portions removed to illustrate the drive mechanism thereof.
Figure 15:
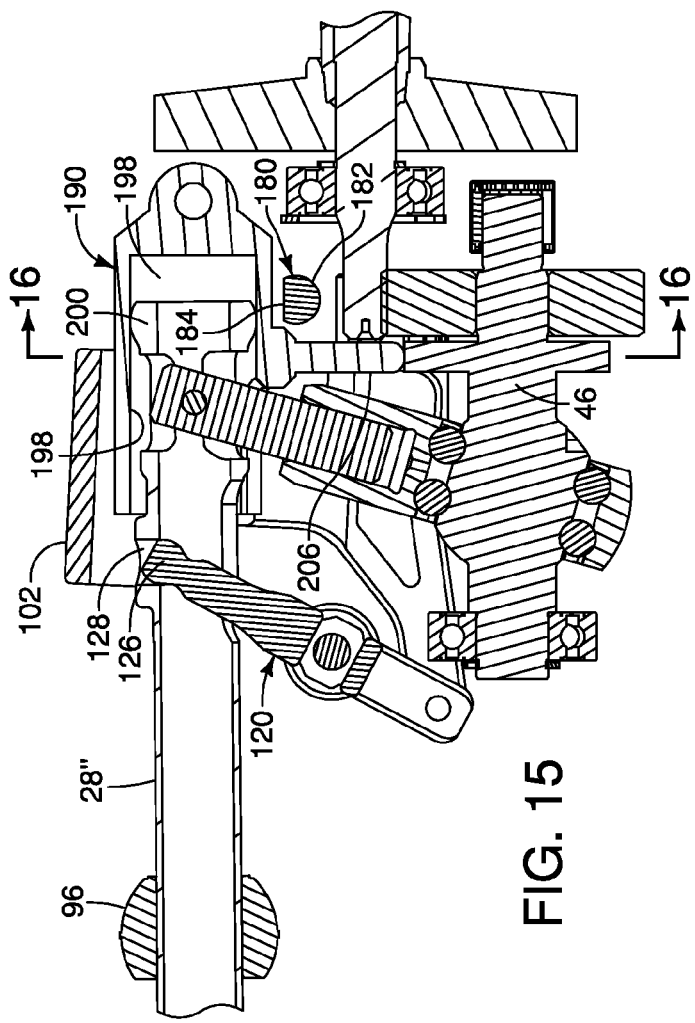
FIG. 15 is a cross-section taken along the center line of the drive mechanism shown in FIG. 14, with an orbital control mechanism shown in an ON position and the plunger in its fully retracted position.
Figure 16:
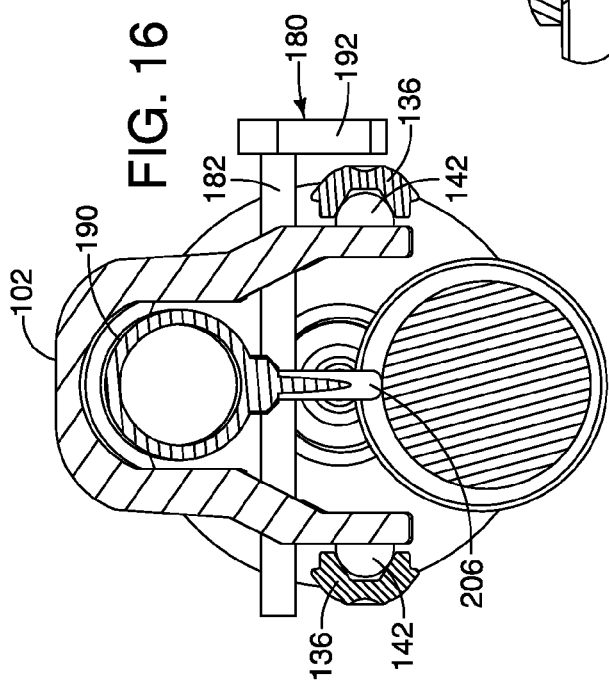
FIG. 16 is a cross section taken generally along the line 16-16 of FIG. 15, but with the plunger shown in its extended position rather than the retracted position as shown in FIG. 15.

A fourth preferred embodiment of the present invention is shown in FIGS. 12 and 13 and all of the components thereof have not been provided, because these embodiments have components that are common with the embodiments of FIGS. 1-4 as well as FIGS. 9-11. The embodiment shown in FIGS. 12 and 13 has a rocker arm 120', which is similar to the rocker arm 120 shown in the embodiment of FIGS. 9-11, but with differences that will be hereinafter described. Similarly, a counterweight 102" is provided with differences between that and the counterweights 102 and 102' being identified. A significant difference in the embodiment of FIGS. 12 and 13 is that the counterweight 102" is supported and reciprocates in a pair of slots 160 which are suitably secured in the housing 12 (not shown) and have a length that is sufficient to permit the counterweight 102" to reciprocate through its full return and cutting strokes. The outside diameter of the rods 160 is sized slightly smaller than the inside diameter of a bushing 162 that is mounted in an enlarged portion of a top side portion 106' of the counterweight 102".

As is evident from FIG. 12, the lower leg portion 110' does not have the horizontal slots that are present in the embodiment of FIGS. 9-11 or well as that shown in FIGS. 5-8. Since the counterweight does not pivot as it is reciprocated by the inner connection with the rocker arm 120', the interconnection of the forward extension 114' is designed to enable vertical movement of the pivot connection to accommodate the vertical movement of the rocker arm during the reciprocating action. In this regard, the forward extension 114' has an elongated slot 164 that is oriented in a vertical direction and the lower part of the rocker arm 120' has a fixed pin 166 sized approximately slightly smaller than the width of the slot 164 so that the pin can ride up and down in the slot during pivoting action of the rocker arm around its pivot pin 122. The interconnection of the upper end of the rocker arm 120 with the spindle 28' is slightly different than that shown in the embodiment of FIGS. 5-8 which employ the ball end 126 that rides in a cylindrical opening 128 a best shown in FIG. 7.

In the embodiment of FIGS. 12 and 13, an enlarged portion 168 of the spindle 28' has a vertical slot 170 that extends through both sidewalls of the spindle 28' and the upper portion 124' has a pin 172 that extends between the spaced arm portion 124'. Because the wobble drive mechanism 42 has a fixed connection between it and the spindle 28', it will be alternately raised and lower to follow the path as described with regard to the embodiment shown in FIGS. 1-4 and particularly as described with regard to the arc 94 shown on FIG. 3. The movement of the spindle 28' in the vertical direction during reciprocation of the spindle A fifth preferred embodiment is shown in FIGS. 14-18 which has features that are common with several other embodiments and which will be broadly described hereinafter. The reference numbers for detailed items of common features are omitted where the structure and functionality is substantially similar to those of other preferred embodiments. If that is not the case, then the reference number for such structure will be identified.

The fifth preferred embodiment shown in FIGS. 14-18 has a counterweight 102 substantially similar to that shown in the second preferred embodiment of FIGS. 5-8, with slight modification that will be hereinafter described. The counterweight 102 is driven by a forward rocker arm 120 that is also substantially similar to that shown in the FIGS. 5-8 in that it has a spherical ball structure 126 at the upper end of the rocker arm 120 that rides in a cylindrical opening 128 of the spindle 28".

This embodiment has an orbital or nonlinear movement similar to the movement shown in the embodiment of FIGS. 1-5, but has the added capability of being turned on and off by an orbital on and off lever mechanism 180 which comprises an elongated rod 182 that has a flat portion 184 which selectively engages a pivotable retaining bushing, indicated generally at 190, for selectively enabling and disabling pivoting movement of the bushing 190 during reciprocation of the spindle 28". The lever mechanism 180 has a handle 192 that an operator can rotate to turn the orbital action on and off as desired. The retaining bushing 190 has a right end portion 194 as shown in the drawings which is pivotally connected by a pivot pin 196 that is suitably secured in the housing 12 (not shown). The bushing 190 has a relatively large cylindrical opening 198 configured to retain an enlarged spherical end portion 200 on the spindle 28".

The length of the cylindrical opening 198 is sufficient to enable the spindle to ride through its full cutting and return strokes. The lower wall of the retaining bushing has a cut-out region, indicated generally at 202, that permits the wobble drive mechanism 42' to guide the spindle 28" through its complete strokes. As is shown in FIGS. 17 and 18, the spindle is fully extended and in FIG. 15, it is shown substantially fully retracted where the spherical end portion 202 is near the right end of the cylindrical opening 198.

The orbital action of the blade is achieved by the spindle 28". The vertical movement of the spherical end portion 200 is achieved by pivoting the retaining bushing 190 about its pivot pin 196. The pivoting action is achieved by the interaction of a cam member 204 engaging a downward extension 206 of the retaining bushing 190. The cam is designed to provide the desired vertical change of the spherical end portion 200 during the cutting and return strokes of the spindle 28" during reciprocation. Such desired motion is a function of the shape of the cam and that is within the level of ordinary skill of those in the mechanical design arts.

Since the orbital movement of the spindle 28" is achieved by the action of the cam member 204 on the retaining bushing 190, the wobble drive mechanism 42 is modified compared to the wobble drive mechanism 42 shown in FIGS. 1-4 and particularly FIG. 3. The modification involves the elimination of a pin 78 which prohibits the adaptor 74 from axial movement in the direction of the line 76 relative to the base arm portion 68. Thus, in the configuration shown in FIGS. 14-18, the adaptor 74 is connected to the spindle 28" by the pin 86 and is a rigid pivotal connection which results in the adaptor 74 moving relative to the base arm 68.

Figure 17:
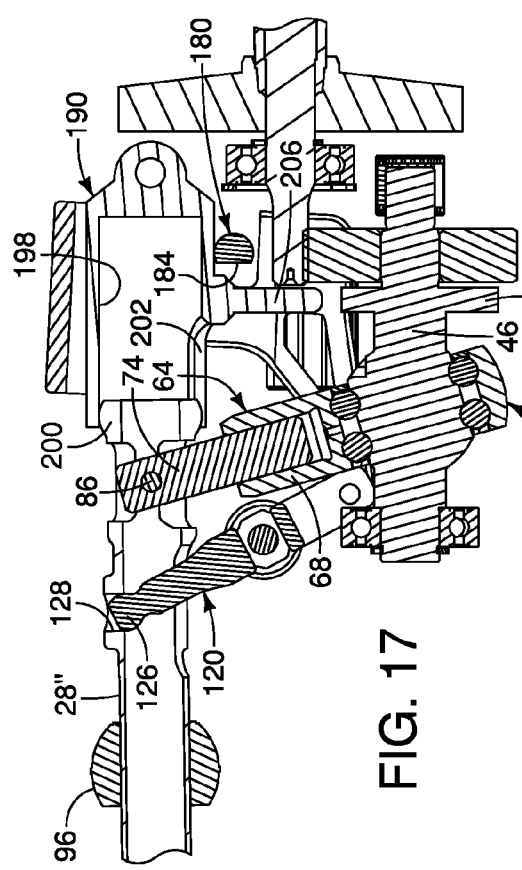
FIG. 17 is a cross section of the fifth preferred embodiment shown in FIG. 16, but illustrating the plunger in its extended position and with the orbital control mechanism in its OFF position.
Figure 18:
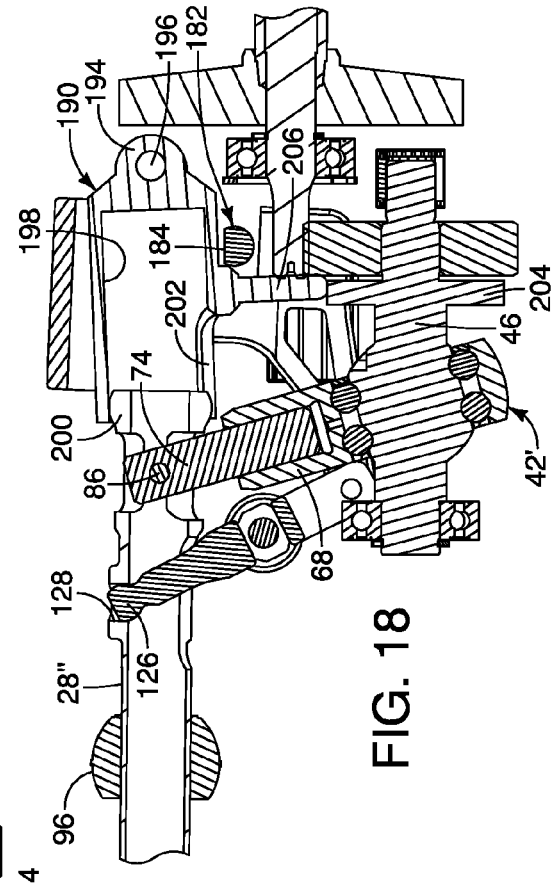
FIG. 18 is a cross section similar to FIG. 17, but illustrating the orbital control mechanism in its ON position.

When the orbital on and off lever mechanism 180 is positioned as shown in FIG. 17, the retaining bushing is prohibited from pivoting the downward direction as is apparent by the gap between the end of the downward extension 206 and the adjacent outer surface of the cam member 204. When the orbital lever mechanism 180 is placed in its on position, as shown in FIG. 18, the retaining bushing 190 is shown to have been pivoted to a lower position by the cam member 204. The counterweight 102 is supported by bushings 136 that operate in the same manner as described with regard to the embodiment shown in FIGS. 5-8.

A sixth preferred embodiment is shown in FIGS. 19-22 which has many components that are substantially similar to other embodiments previously described including a counterweight 102 which is driven by a rocker arm 120 that is substantially similar to that shown and described with regard to the embodiment of FIGS. 14-18 and has a wobble drive mechanism 42 that is substantially similar to that shown in FIGS. 1-4, which includes the elongated arm 64 as is also shown and described in those figures. The spindle is driven through the nonlinear arc as described with regard to the embodiment of FIGS. 1-4, however, the sixth preferred embodiment has the counterweight 102 modified in a manner whereby the counterweight is mounted and driven in a manner whereby the counterweight 102 itself is moved vertically as it is reciprocated back and forth. The movement is done in a manner whereby the counterweight motion is synchronized to optimize its position to match that of the plunger shaft orbital movement.

This movement effectively reduces the vibration of the mechanism in the vertical direction. This is achieved by providing a horizontal shaft 152' that fits within horizontal slots 150 on each lower leg portion 110 which shaft 152' is similar to that shown and described with regard to shaft 150 in the configuration shown in FIGS. 9-11, except that the shaft has a slightly reduced size annular groove 210 located on opposite sides of each leg in which C clips 212 are mounted for the purpose of maintaining the shaft 152 centered relative to the counterweight. The outer ends of the shaft 152' are secured in elongated bushings 212 that have a vertical bushing 214 that has a width slighter larger than the outside diameter of the outer end portions of the shaft 152' so that the shaft can move vertically within the bushing 214. Slots 216 are provided in the bushing 214 and include a spring 218 to bias the rod 152' downwardly so that the center of the shaft is maintained in contact with a cam member 220 that is mounted on the drive shaft 46. The bushing 214 is suitably mounted in the housing 12 (not shown). As previously mentioned, the configuration of the cam member surface 220 can be synchronized so that the shaft 152' and counterweight 102 will be vertically moved during reciprocation of the spindle 28" and counterweight 102 to optimize the counterweight position during such reciprocation so that the motions of the two components are matched to reduce the vibration of the mechanism in the vertical direction.

Figure 22:
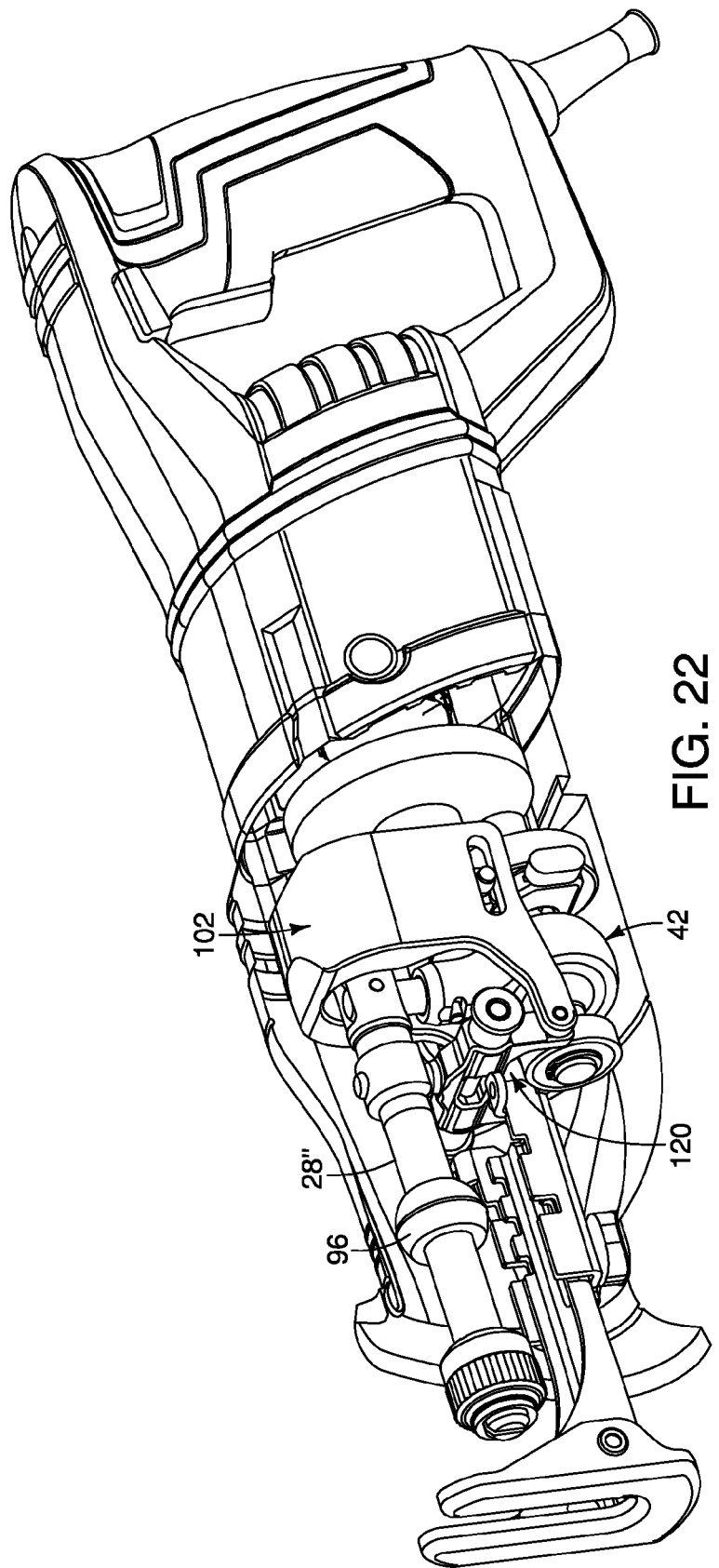
FIG. 22 is a perspective view of a seventh preferred embodiment of the present invention shown with portions removed to illustrate the drive mechanism thereof.
Figure 25:
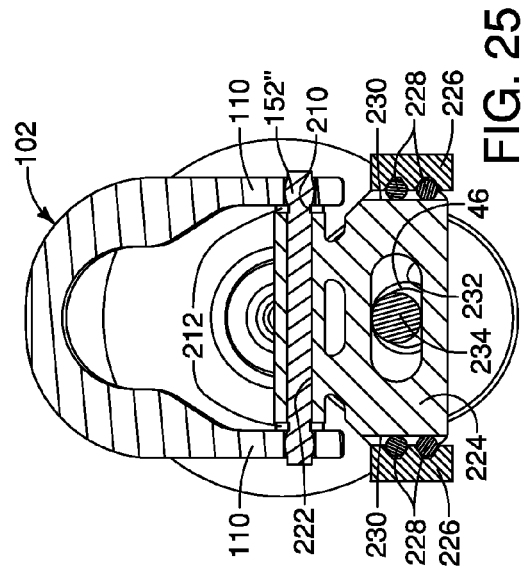
FIG. 25 is a cross section taken generally along the line 25-25 of FIG. 23.
Figure 23:
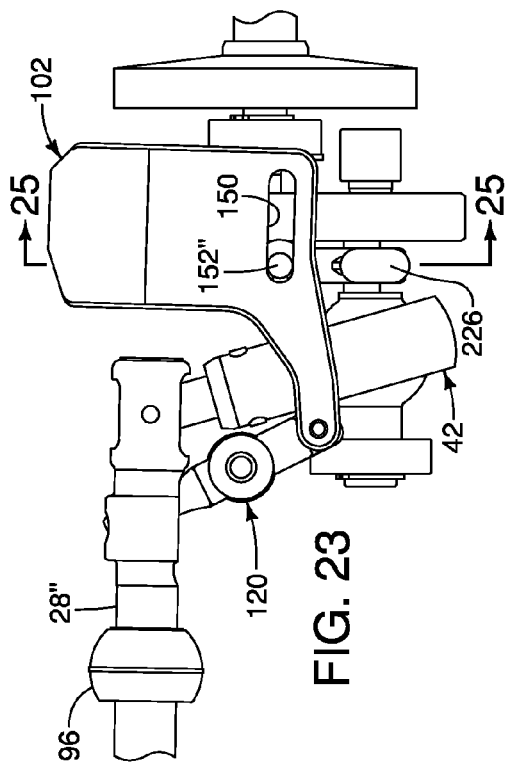
FIG. 23 is a side plan view of the seventh preferred embodiment of the present invention shown in FIG. 22.
Figure 24:
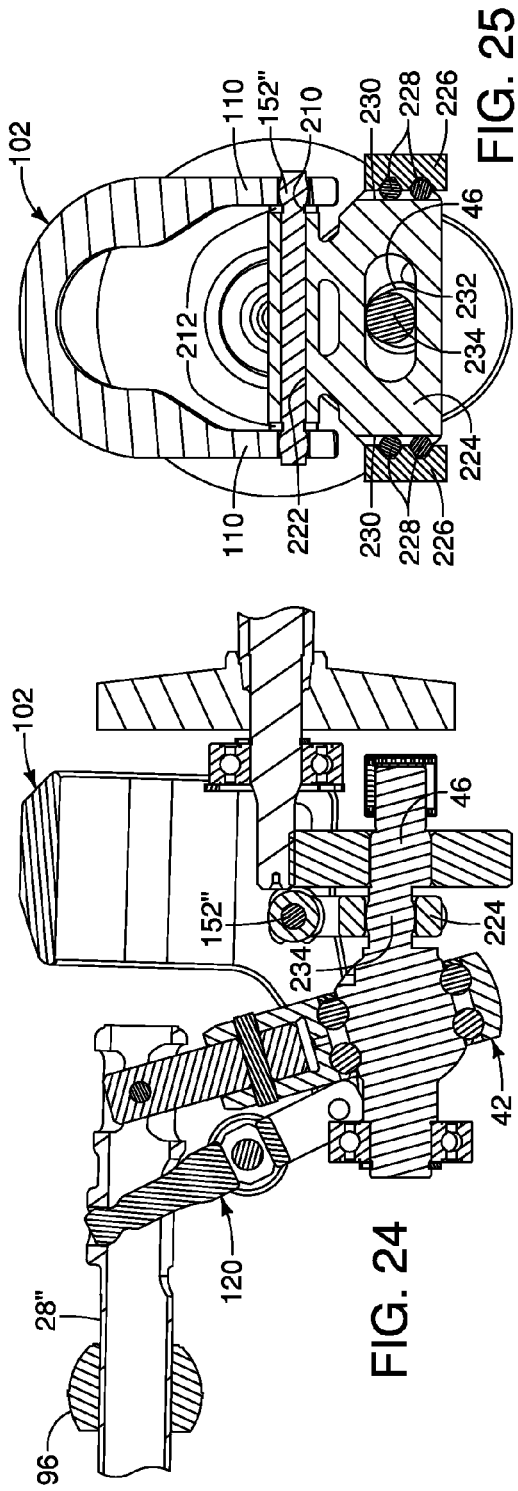
FIG. 24 is a cross section taken generally along the center line of the embodiment shown in FIG. 23.

A seventh preferred embodiment is shown in FIGS. 22-25 which is very similar to the configuration shown in FIGS. 20-22 with regard to the wobble drive mechanism 42, the rocker arm 120, the spindle 28" and the counterweight 102, with the latter being supported by a modified mechanism. The modifications relate to the horizontal shaft 152" which has the same interface with the lower legs 110 of the counterweight 102, but the outer ends do not extend significantly beyond the outside surface of the legs 110 which therefore contributes to the compactness of the design. The horizontal shaft 152 is secured in a cylindrical opening 222 of a link member 224 that extends downwardly below the bottom surface of the counterweight 102 and which is mounted in vertically oriented bushings 226 in which balls 228 are provided which ride in a vertical channels 230 provided in the link member 224. The link member has a horizontal slot 232 with a vertical dimension that is slighter larger than the outside diameter of the cam member 234 which is machined in the drive shaft 46. The cam member causes the link member 224 to move vertically relative to the bushings 226 which are suitably mounted in the housing 12 (not shown). The horizontal shaft 152 is alternatively fixed in the link member 224 so that it does not rotate or it may be rotatable within the cylindrical opening 222 or it may be secured in suitable bearings to rotate freely than if it has contact throughout its length within the link member 224. As is the case for the embodiment shown in FIGS. 19-21, the cam surface may be designed so that the counterweight 102 will be vertically moved during its reciprocation in order to balance against the movement of the spindle and the wobble drive mechanism 42 to minimize the vibration that it is produced during operation of the reciprocating saw.

An eighth preferred embodiment is shown in FIGS. 26-31 and is broadly similar to the embodiment particularly shown in FIGS. 14-18 and also has features that are common with several other embodiments. The reference numbers for detailed items of common features may be omitted where the structure and functionality is substantially similar to those of other preferred embodiments and have been described with regard to those embodiments. If a feature is slightly different from that previously described with regard to the embodiment shown in FIGS. 14-18, it may be given a slightly different designator to note its differences.

The eighth preferred embodiment shown in FIGS. 26-31 has a counterweight 102 substantially similar to that shown in the preferred embodiment of FIGS. 14-18. counterweight 102 is driven by a forward rocker arm 120 that is also substantially similar to that shown in the FIGS. 5-8 in that it has a spherical ball structure 126 at the upper end of the rocker arm 120 that rides in a cylindrical opening 128 of the spindle 28".

This embodiment has a nonlinear movement capability of that can be turned on and off by an orbital ON and OFF lever mechanism 180' which comprises an elongated rod 182' that has an oval or elliptical cross-sectional cam surface configuration, i.e., it has a major axis and a minor axis, which cam surface engages the outer lower surface of a retaining bushing, indicated generally at 190, that pivots around a pivot pin 191 for selectively positioning the angle of the center axis of the bushing 190 relative to the pivot pin 191 during reciprocation of the spindle 28". The lever mechanism 180' has a handle 192 that an operator can rotate to control the angle of the retaining bushing and therefore non-linear blade movement action as desired.

Figure 27:
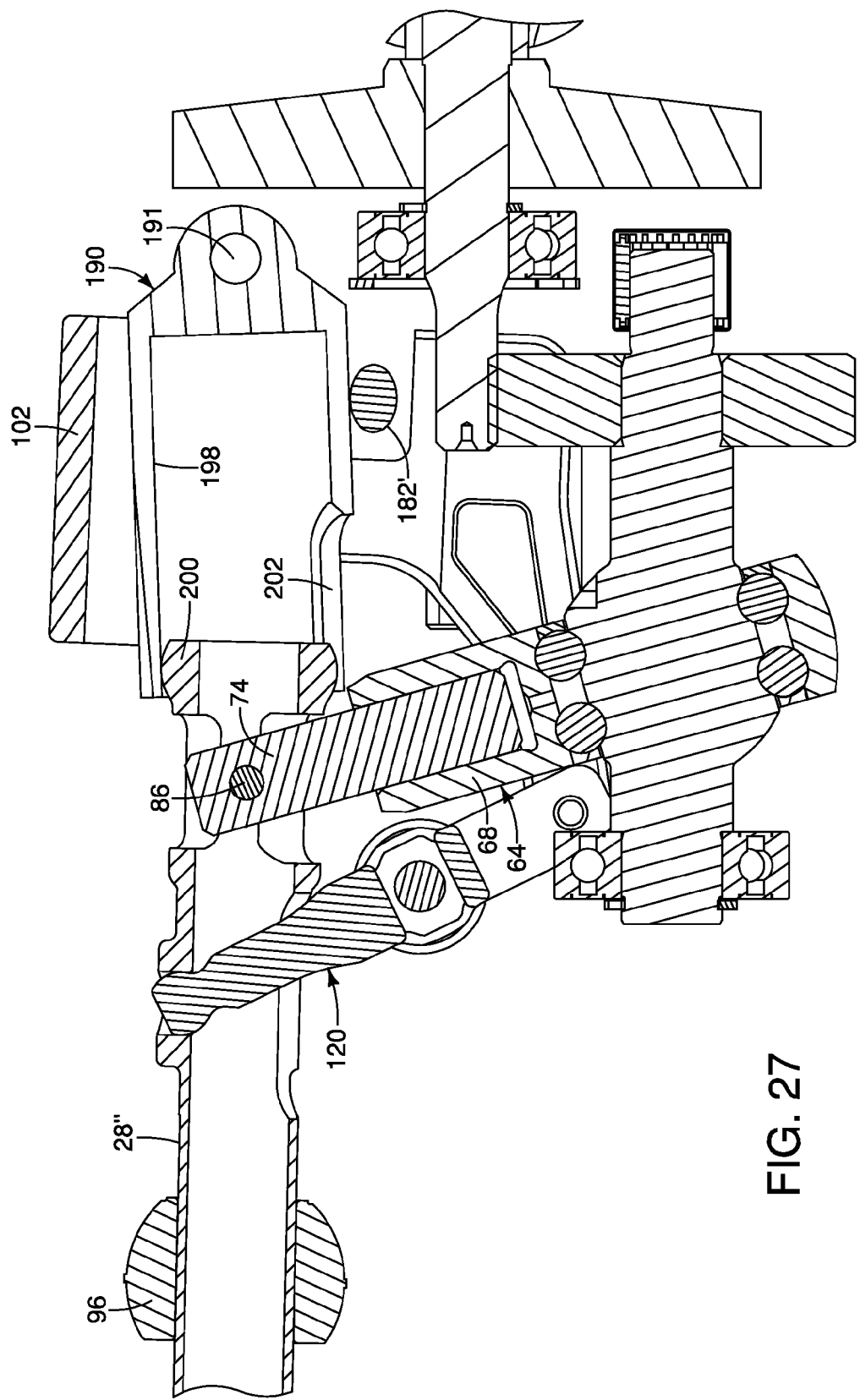
FIG. 27 is side view of a cross-section taken along the center line of the drive mechanism of the reciprocating saw shown in FIG. 26, illustrating the spindle in an extended position and with an orbital control lever in an ON position.
Figures 28, 29:
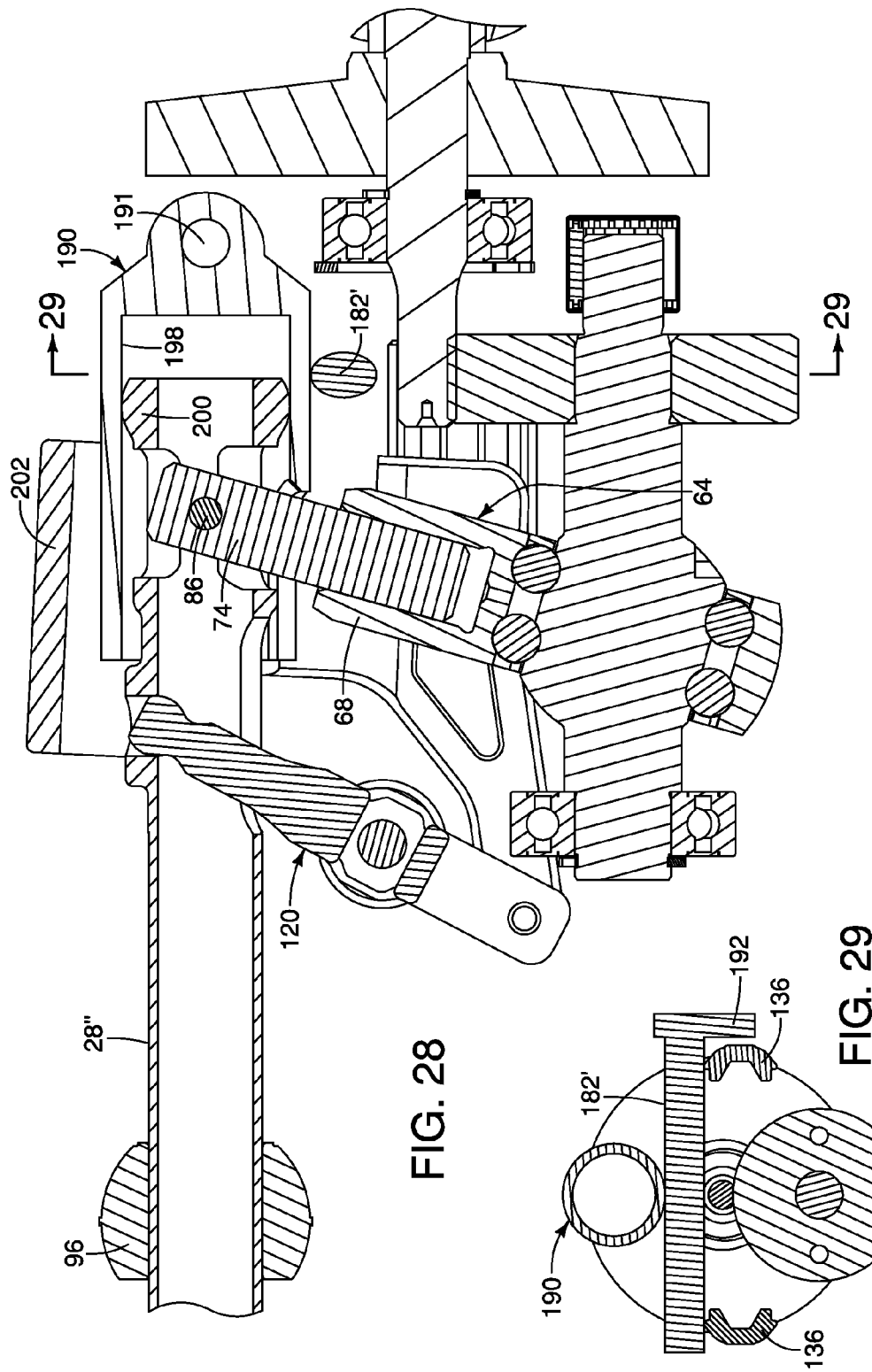
FIG. 28 is side view of a cross-section taken along the center line of the drive mechanism of the reciprocating saw shown in FIG. 26, illustrating the spindle in a retracted position and with an orbital control lever in an OFF position.
FIG. 29 is a cross section taken generally along the line 29-29 of FIG. 28.

In this regard, and referring to FIG. 28, the rear spherical end portion 200 rides within the cylindrical chamber 198 of the retaining bushing 190 which is shown in its retracted position in FIGS. 28 and 30 and in a forwardly extended position as shown in FIG. 27. It should be understood that as the spindle 28" reciprocates by being driven by the elongated arm 64, the spherical end portion 200 will also be selectively moved in a vertical direction during such reciprocation as a function of the angular position of the retaining bushing 190 relative to the pivot pin 191.

Figure 26:
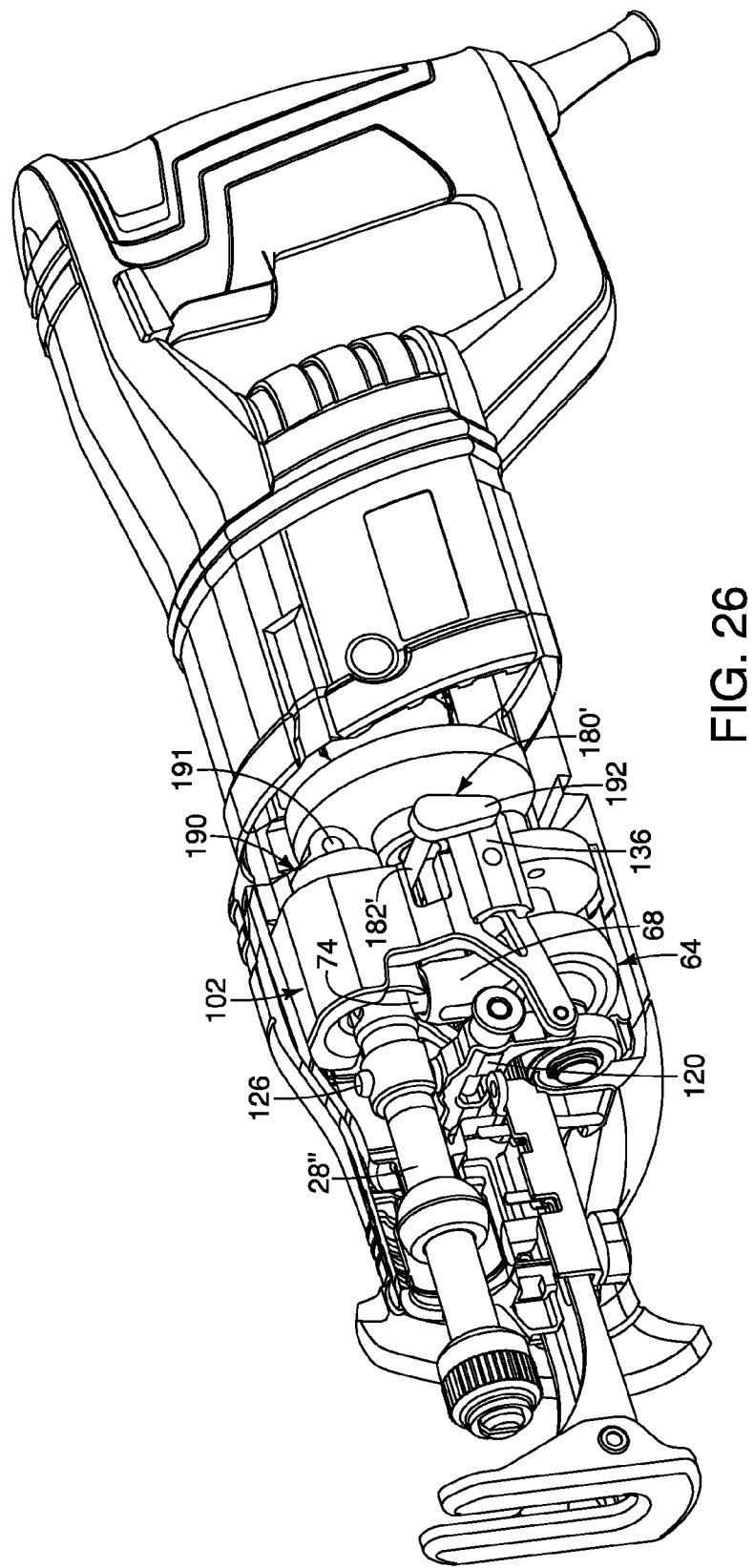
FIG. 26 is a perspective view of an eighth preferred embodiment of the present invention shown with portions removed to illustrate the drive mechanism thereof and illustrating an orbital action control lever in an OFF position.

If the center axis of the cylindrical chamber 198 (and therefore the center axis of the bushing 190 itself) is perfectly horizontal, the spindle 28' will be moved in a perfectly horizontal manner and in that horizontal position, there is no nonlinear, i.e., vertical motion imparted to a blade that is attached to the free end of the spindle 28". Such a horizontal position is shown in FIGS. 26 and 28, wherein the handle 192 is in a vertical orientation and the elongated rod cam surface 182' has its major axis oriented vertically so that it urges the retaining bushing 190 to a nearly true or substantially horizontal position. However, when the handle 192 is rotated 90° to a relatively horizontal position, such as shown for the lever 180 in the embodiment shown in FIG. 14, the axis of the retaining bushing 190 will be angled downwardly in the forward direction as shown in FIGS. 27 and 30.

When the retaining bushing 190 is positioned so that it is angled downwardly as shown in FIGS. 27 and 30, the spherical end portion 200 will move downwardly as the spindle 28" is moved to its leftward or extended position which will cause the blade to move upwardly because the spindle 28" is constrained by the bushing 96 that is located between the blade and the end portion 200. As the spherical end portion moves from its fully extended position rightwardly toward the fully retracted position, the blade will be moved downwardly as the spherical end portion 200 is moved upwardly during its travel.

Such change in the elevation of the blade will create a more aggressive engagement of the saw blade with a work piece which can accelerate cutting depending upon the type of material that is being cut. It should be understood that such nonlinear action results in a curved path of movement by the blade, but the blade follows an identical line during cutting stroke as well as the return stroke, which is not a true orbital path which is traversed by a blade in accordance with most prior art circular saw designs.

It should also be understood that the amount of movement by the cam surface 182' may only cause a change in elevation of the outer surface of the cam 182' on the outer surface of the retaining bushing 190 by a small distance, such as a single millimeter. In this regard, the actual shape of the elongated rod cam surface 182' is exaggerated in FIGS. 27, 28 and 30. While it should be evident from the description of the embodiment of FIGS. 14-18, the spherical end portion 200 of the spindle 28" is able to travel within the cylindrical chamber 198 without interference, because the arm adapter 74 is axially adjustable within the base arm portion 68 of the elongated arm 64 which drives the spindle 28".

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A drive apparatus for a reciprocating tool, comprising;
a housing;
a rotatable drive shaft assembly located in said housing;
an elongated spindle located in said housing for reciprocating motion, said spindle having a front end portion for attaching a cutting blade thereto and a rear portion;
a front bushing in said housing for supporting the front end portion of said spindle, said bushing permitting reciprocating and limited angular motion of said spindle therein; and
a wobble drive mechanism comprising a wobble drive shaft connected to said drive shaft assembly, an elongated arm having a lengthwise axis extending upwardly from said wobble drive shaft and including an upper interface for reciprocating said spindle generally in its lengthwise direction during alternating cutting and return strokes;
wherein said upper interface connects said arm to said spindle in a manner that prevents translational movement of said spindle relative to said arm in the direction of the arm lengthwise axis and therefore causes a cutting blade attached to said front end portion to travel through an arc-like path that is traversed in said cutting and return strokes:
wherein said upper interface is configured for limited rotational movement, with respect to said arm, about the lengthwise axis of the arm but is prevented from axial movement along the lengthwise axis, with respect to said arm.

2. A drive apparatus for a reciprocating tool, comprising;
a housing;
a rotatable drive shaft assembly located in said housing;
an elongated spindle located in said housing for reciprocating motion, said spindle having a front end portion for attaching a cutting blade thereto and a rear portion;
a front bushing in said housing for supporting the front end portion of said spindle, said bushing permitting reciprocating and limited angular motion of said spindle therein; and
a wobble drive mechanism comprising a wobble drive shaft connected to said drive shaft assembly, an elongated arm having a lengthwise axis extending upwardly from said wobble drive shaft and including an upper interface for reciprocating said spindle generally in its lengthwise direction during alternating cutting and return strokes;
wherein said upper interface connects said arm to said spindle in a manner that prevents translational movement of said spindle relative to said arm in the direction of the arm lengthwise axis and therefore causes a cutting blade attached to said front end portion to travel through an arc-like path that is traversed in said cutting and return strokes;
wherein said upper interface comprises an adapter that is configured to be connected to said arm and said spindle by first and second pivot connections at opposite end portions, said pivot connections being oriented perpendicular to one another, said first connection between said adapter and said arm permitting side to side pivoting movement of said spindle, and said second connection between said adapter and said spindle permitting reciprocating movement of said spindle in its lengthwise direction.

3. A drive apparatus as defined in claim 2 wherein said arm has an upper end portion with a recess configured to receive said adapter, said adapter having a generally cylindrical shape with a lengthwise axis and being sized to loosely fit within said recess and be pivotable in two orthogonal directions relative to said arm.

4. A drive apparatus as defined in claim 3 wherein said first pivot connection comprises a first pin interconnecting said adapter and said arm, said first pin being oriented generally in the lengthwise direction of said spindle to thereby permit said side to side pivoting movement of said spindle.

5. A drive apparatus as defined in claim 4 wherein said second pivot connection comprises a second pin interconnecting said adapter and said spindle, said second pin being oriented perpendicular to the lengthwise axis of said adapter and perpendicular to said first pin.

6. A drive apparatus as defined in claim 5 wherein said arm has at least one elongated slot in which said first pin is positioned, said slot permitting rotation of said adapter about its lengthwise axis through a predetermined angular arc in said arm, while prohibiting movement of said adapter in said arm in the direction of said arm axis.

7. A drive apparatus for a reciprocating tool, comprising;
a housing;
a rotatable drive shaft assembly located in said housing;
an elongated spindle located in said housing for reciprocating motion, said spindle having a front end portion for attaching a cutting blade thereto and a rear portion;
a front bushing in said housing for supporting the front end portion of said spindle, said bushing permitting reciprocating and limited angular motion of said spindle therein; and
a wobble drive mechanism comprising a wobble drive shaft connected to said drive shaft assembly, an elongated arm having a lengthwise axis extending upwardly from said wobble drive shaft and including an upper interface for reciprocating said spindle generally in its lengthwise direction during alternating cutting and return strokes;
wherein said upper interface connects said arm to said spindle in a manner that prevents translational movement of said spindle relative to said arm in the direction of the arm lengthwise axis and therefore causes a cutting blade attached to said front end portion to travel through an arc-like path that is traversed in said cutting and return strokes;
further comprising a pair of elongated rods secured in said housing on opposite sides of said arm for limiting angular movement thereof relative to a lower pivot connection of said drive shaft assembly, wherein said elongated rods are in slidable contact with said arm, and
wherein said elongated rods maintain said arm in a vertical position during reciprocation of said spindle.

* * * * *